INVENTOR.
Jack C. Whitesides
BY
Newton, Hopkins & Jones
ATTORNEYS

Aug. 20, 1968 J. C. WHITESIDES 3,397,748
SOIL TREATMENT DEVICE
Filed Sept. 2, 1964 3 Sheets-Sheet 3
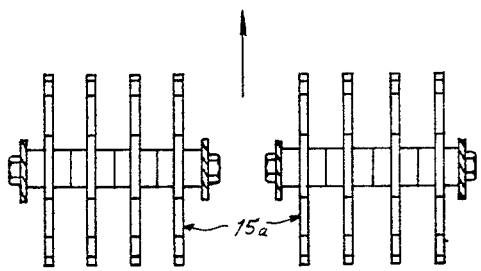
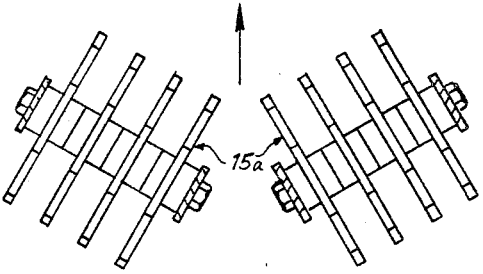
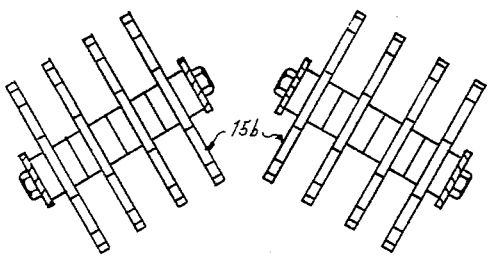
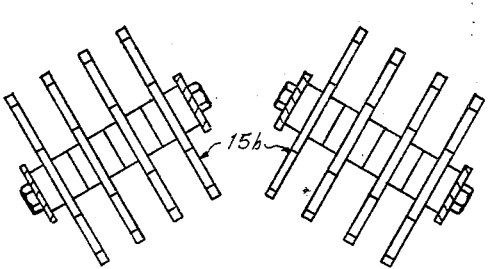
Fig 6
Fig 7
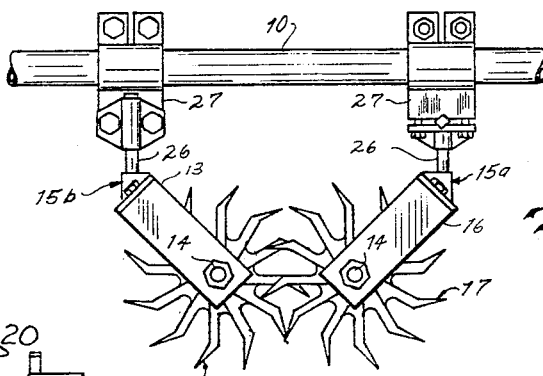
Fig 4
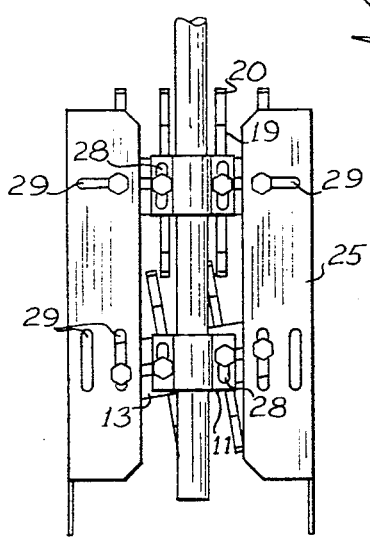
Fig 5
INVENTOR.
Jack C. Whitesides
BY
Newton, Hopkins + Jones
ATTORNEYS

United States Patent Office 3,397,748
Patented Aug. 20, 1968

3,397,748
SOIL TREATMENT DEVICE
Jack C. Whitesides, Albany, Ga., assignor to Lilliston Implement Company, Albany, Ga., a corporation of Georgia
Filed Sept. 2, 1964, Ser. No. 393,852
2 Claims. (Cl. 172—548)

This invention relates to a soil treatment device, tilling tool and cultivator for attachment to an agricultural implement such as a cultivator or planter for use in applying liquid, spray, dust, or solid herbicides, insecticides, fungicides, fertilizers and plant foods to the soil to reach a substantial depth below the surface of the soil and intimately intermixing the applied substances with the soil.

One of the advantages of this invention is the provision of an exceedingly simple, high speed, highly efficient tool for the above purpose. The device has been constructed so that a plurality of the tools can be easily and quickly mounted on a cultivator for operation on any number of plant rows.

It has been found that chain driven and other similarly driven devices used for cultivating the soil will rapidly build up with soil to the extent that the chain or other driving device will bind and rupture or become dislodged from its associated mechanism. Because of this difficulty, it is obvious that it would be more desirable to use a device that is not power driven. However, until the conception of the instant invention previous non-driven devices did not give satisfactory intermixing of the soil, and the operator was forced to make more than one pass over the same area.

Accordingly, it is an object of this invention to give a high speed single pass operation in mixing various substances with soil.

Another object of the present invention is to provide control means for operating the spider tines at various depths of soil penetration.

Another object of this invention is to provide means for intermixing a chemical with soil to a uniform depth in the soil.

Another object of this invention is to provide a means of varying the degree of mixing or agitation which would function independently of the ground speed.

A further object of this invention is to provide the most economical arrangement for incorporating chemicals with the soil in direct relationship to band width with a cultivator rig on which the chemical package would be attached.

Other objects, and advantages reside in the detailed construction of the invention, which is designed for simplicity, economy, and efficiency. These will become more apparent from the following description.

In the following detailed description of the invention reference is had to the accompanying drawings which form a part thereof. Like numerals refer to like parts, in all views of the drawings and throughout the description.

In the drawings:

FIG. 4 is a fractional side view of the apparatus showing the adjusting means;

FIG. 5 is a top plan view showing the over-lapping of the spiders, and the adjustable features of the spiders and shield; and, FIGS. 6 and 7 are schematic showings illustrating the various angles that the gangs can be mounted in relation to the path of movement of the device.

In actual use, a plurality of tandem gang assemblies would be employed, one for each plant row.

The usual conventional mounting means can be employed for this invention, some of these mounting means being shown in the Lehman et al., Patent No. 2,994,387 and the Whiteside application No. 366,777, filed Jan. 9, 1964. Various other conventional mounting means can also be employed.

Figure 2:
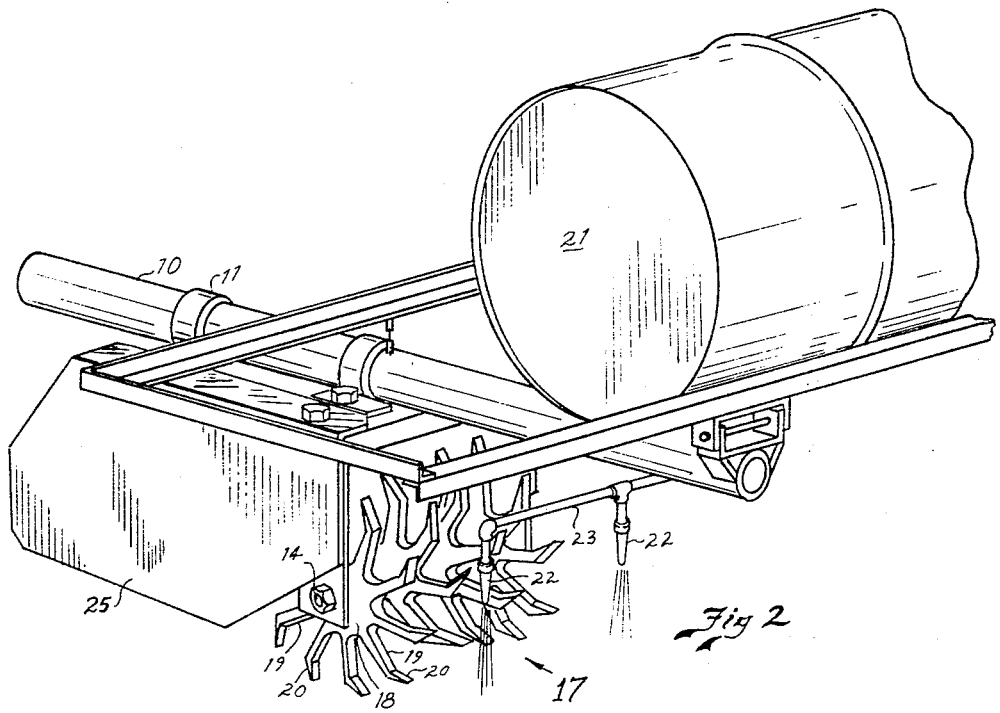
FIG. 2 is a perspective view of the invention showing the mounting of the spiders onto the rigging and the association of the liquid spray tank and nozzles therefor.

Referring now to the drawings, numerals 15a and 15b represent forward and after gangs of rotary hoes in a tandem arrangement on a cultivator. The forward and after gangs are mounted on a mounting means 10 which mounting means is adapted to be connected to a tractor or other pulling device. Clamp 11 is attached to the mounting means 10 and secures bar 12 thereto. Bar 12 in turn supports the frame 13 on which the spider gangs 15a and 15b are supported. The frame 13 is adapted to receive an axle at 14 through the lower extremities thereof. The axle as seen in FIG. 2 is mounted in the frame and serves to hold the spiders thereon. The spiders are separated by separator means or spacers 16 as best seen in FIGS. 6 and 7.

Referring to FIG. 2, the spiders 17 are composed of a hub 18 which surrounds the axle 14 and inner tine portion 19 which is attached to the hub in a circumferential arrangement and radially extending from the hub, and finally an outer tine portion 20. The outer portion of the tine is disposed at an angle from the inner portion thereof. The plane of the surface of the outer portion of the tine is approximately tangential to the hub 18. The spiders are mounted so that they are free to rotate and will be caused to rotate by moving the tandem gang assembly along the surface of the soil.

Mounted on the conventional frame means is a tank 21 which is adapted to hold a liquid. Depending from the tank is a conduit 23 which leads to nozzle means 22, these nozzles functioning to spray the liquid in front of the tandem gang assembly so that the liquid is spread or applied in the surface of the soil in front of the gang. Instead of having a spray assembly a conventional hopper can be used to spread a granular type of substance to the soil. This is illustrated in FIG. 1 by the hopper 24 being mounted upon the conventional mounting means 10.

A shield 25 is adjustably mounted over the tandem gang assembly so as to prohibit the churned soil from being thrown out of the area over which the spiders passed. This shield 25 also serves to channel the soil flung upwardly by the rear spider arrangement into the area between the forward and rear spider gangs.

Figure 1:
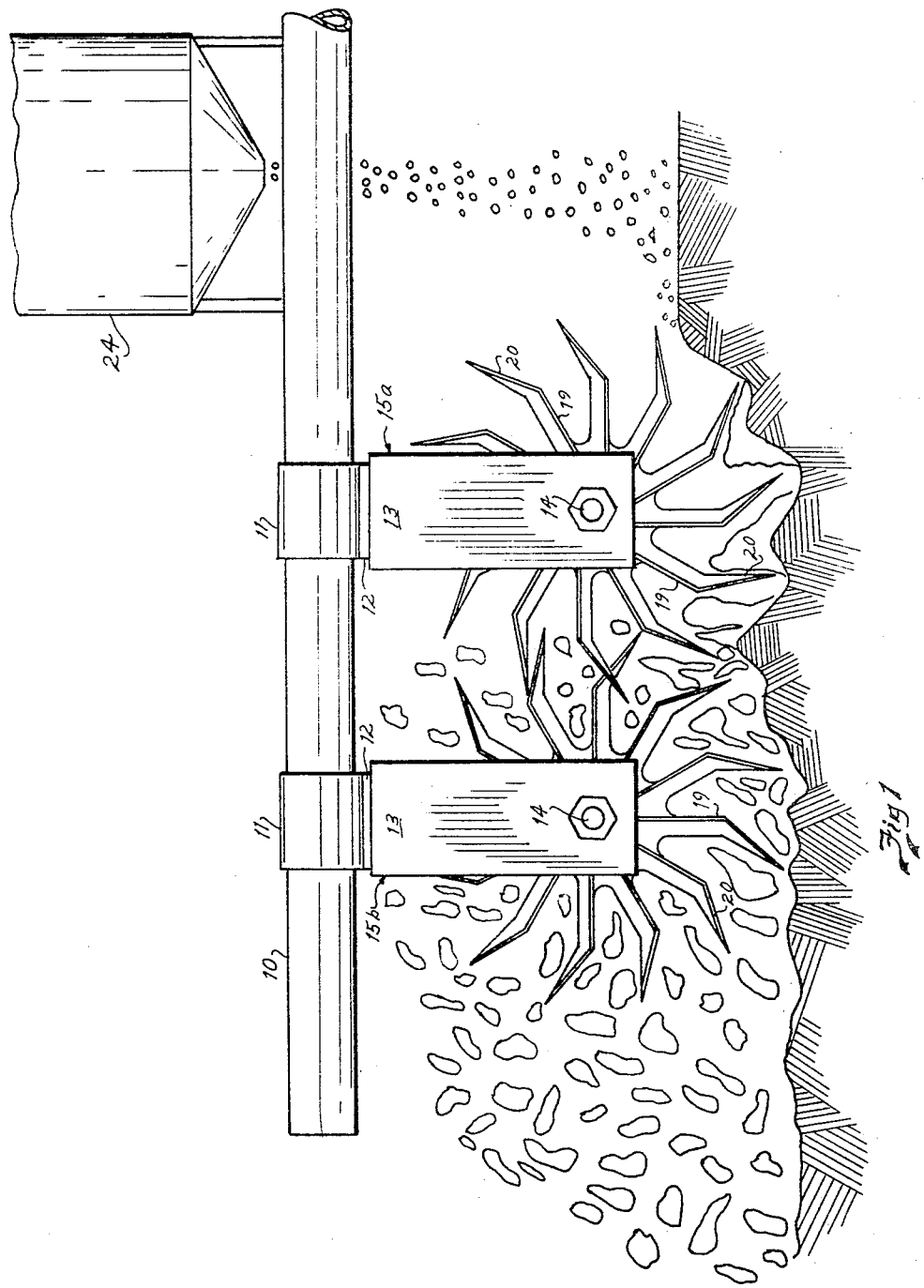
FIG. 1 is a side view of the tandem gang arrangement showing the over-lapping spiders and their co-action with the soil surface.

Referring now to FIG. 1 of the drawings, it can be seen that the forward gang assembly has its spiders arranged so that the tip of the spider lags the main portion thereof so that when the outer portion of a tine comes in contact with the ground it is substantially parallel thereto and its first action is to press that portion of the soil down into the ground. A substance on the surface of the soil at this point will be pressed into the ground and forced into the soil. During the rotation of the spider through the ground the spider tines will have the action of pressing the surface down into the soil and will eventually have a slipping action in which it will grate the substance into the soil and subsequently will be the motivating force that causes the rotation of the spider. It should be noted also that when the tine departs from the surface of the soil that it will remove itself gently without substantially disturbing the soil thereby leaving that substance which it pressed into the soil at a substantial depth.

Although the after gang assembly 15b is constructed similarly to the forward gang assembly it should be noted that the outer tine pieces 20 have been reversed so that these outer tines lead the inner tine portions 19 in normal rotation. Because of this manner of construction it can be seen in FIG. 1 where the outer tine makes contact with the soil its immediate action will be a deep penetration without substantial disturbance of the soil. This penetration helps the spider to rotate and is the motivating force of the spider. After the after gang of spiders reaches its lower most penetration it can be seen that the tine begins to lift itself out of the ground and each tine will tend to carry a portion of soil with it so that it tears and removes the soil from the ground. A great portion of this soil is carried up and out of the ground and flung out by centrifugal force. Some of the soil carried out of the ground remains on the tine to a point where it is flung out and up and over the gang into the area between the forward gang and the after gang. It should be noted that the action of the after gang causes a great disturbance in the soil and churns and mixes the soil thoroughly.

Figure 3:
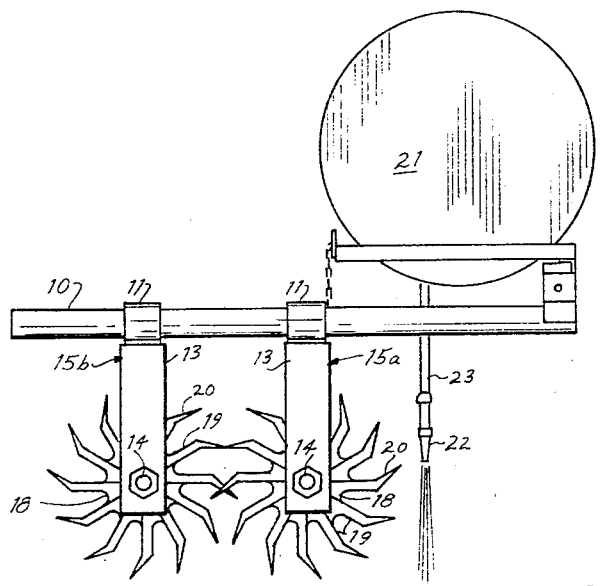
FIG. 3 is a side view of the apparatus shown in FIG. 2 but with the cover removed therefrom.

Referring now to FIG. 6, it can be seen that the forward gangs are arranged as shown in the previous figures, however, the after gangs are shown disposed on an angle in relation to the forward gang. In this relationship when the outer portion of the tine of the after gang enters the ground the tine piece will not remain in substantially the same portion of ground in which it entered but will have an added slipping action across the path of the tandem gang assembly. It should be noted that in this arrangement, both the after gangs are arranged so that the slipping movement is from the outside towards the inside, which will cause a build-up of soil towards the inner side of both of the after gangs. Obviously, the build-up of soil could be towards the outer side of the gangs by reversing the axes of the after gangs. The arrangement of the after gangs 15b of FIG. 6, will cause a greater agitation of the soil than the axially aligned gangs as demonstrated by FIG. 3.

An even greater agitation can be effected by angling both the forward and the rear ganges as demonstrated in FIG. 7. Here, when the tines of the forward gang pierce the ground the action of the tine will cause not only its pressing action, but will also add to it a cross-wise shearing action when the tine is forced to cross the ground transverse to the axis in which the assembly is moving. This action will cause the substance ahead of the tandem gang assembly which was applied to the soil surface to be forced into a greater area of the sub-soil, and will also add a slight churning effect to the soil as the substance is being pressed into the ground. Obviously, other angle arrangements are available to the operator by rotating the frame 13 of FIG. 1, around bar 12, or as shown in FIG. 4, rotating the frame 13, around bar 26. Also FIG. 4 shows that the gangs can be rotated on bar 26 in bracket 27 so that the axis of rotation can be angled with the surface of the ground.

In operation of the device the driving means associated with the device drives the mounting means 10, and the tank 21 being mounted on the mounting means allows the liquid in the tank to flow by gravity or pressure means through conduit 23, through the nozzles 22, whereupon a spray is applied to the surface of the soil ahead of the tandem gang device. The motion of the device across the ground causes the spiders to rotate themselves by each tine of the spider coming in contact with the ground and forcing its own rotation. As each spider tine rotates it comes in contact with the ground and presses the amount of soil which it contacts into the ground and accordingly presses the spray on the surface of the ground into the ground. Upon reaching the lower end of the arc the motion of the forward spiders is such that the tine begins to lift itself out of the ground in a gentle fashion. In the second 90° quadrant after entering the ground, the spider is forced against the soil by the motion of the driving vehicle and the forces generated by this action cause the rotation of the spider. The rear spider 15b operates so that the tines gently enter the ground and upon reaching the lower end of the first quadrant while in the ground the spider begins to dig or tear the soil away. Upon reaching the area of the second quadrant while in the ground the spider begins to lift the soil up and away from the ground and it ultimately flings the soil out and away from the spider and in some instances completely up and over the spider into the area between the forward and after gang. It can be seen that the soil that enters into the area between the forward and after gang will be again thoroughly churned by the relative movement of the forward and after gang tines.

An alternate form of the invention would embody a hopper means as shown in FIG. 1 in place of the liquid tank means 21. The hopper means would be actuated in the conventional manner as by an agitator shaft or, in the case of a uniform granulated substance, by just an opening in the bottom thereof.

It should be obvious at this point that the invention affords a new method of cultivating soil which comprises compressing a portion of the surface of the soil to a depth below the surface and churning the compressed portion with a surrounding portion of the soil and the surface of the soil. This affords the operator a fast one pass operation of the device in mixing herbicides uniformly with the soil for an efficient operation. It provides for an effective depth control, saves tractor time and is accomplished in one operation. The device is adaptable to varying terrain, mulches and maintains seed beds prior to planting and can pulverize crust before and/or after planting. It will tilt to conform to almost any bed shape and angles to increase aggressiveness of chemical mixing as well as cultivating, and can be adapted to fit most existing cultivator rigs, front or rear mounted. The device costs far less to own and far less to maintain than the power driven type and is more effective than the other non-power driven types. By adjusting the frame and axle size it can be seen that gangs of different widths can be employed with a varying number of spiders thereon. Also, as best seen in FIG. 5, both the forward and after frames can be angularly adjusted with respect to the direction of movement of the device and the orientation of the shields 25. This adjustment is made possible by the configuration of the attaching slots 28 and 29 in the frames 13 and shields 25, respectively.

It should be obvious at this point, that this new and novel device affords the operator great economy, efficiency, effectiveness, and speed of operation, and while a specific form of the improvement has been described and illustrated herein, it is desired to be understood that the same may be varied and yet remain in the spirit and scope of the appended claims.

What is claimed as invention is:

1. A soil treatment device comprising a tandem gang arrangement of rotary hoes adapted to be connected to a cultivator rig, including means for moving at least one gang arrangement through a vertical arc independently of movement of the other gang arrangement, said hoes having a hub portion and a plurality of tines, said tines having a central portion and a peripheral portion, said central portion connected to and extending radially outwardly from said hub portion and said peripheral portion connected to said central portion and extending on an angle therefrom, the peripheral portion of said hoes on the front gang being arranged to lag the central portion thereof, and the peripheral portion of said hoes on the rear gang being arranged to lead the central portion thereof during rotation.

2. A soil treatment device comprising a tandem gang arrangement of rotary hoes adapted to be connected to a cultivator rig, including means for moving at least one gang arrangement through an arc independently of movement of the other gang arrangement, and means for confining ejected soil material within an area surrounding the tandem gang arrangement, wherein said means for moving at least one gang arrangement comprises means for moving at least one gang arrangement through a vertical arc, and said means for confining ejected soil material comprises shielding material affixed to the cultivator rig adjacent opposite ends of said tandem gang arrangement, said hoes having a hub portion and a plurality of tines, said tines having a central portion and a peripheral portion, said central portion connected to and extending radially outwardly from said hub portion and said peripheral portion connected to said central portion and extending on an angle therefrom, the peripheral portion of said hoes on the front gang being arranged to lag the central portion thereof, and the peripheral portion of said hoes on the rear gang being arranged to lead the central portion thereof during rotation.

References Cited

UNITED STATES PATENTS

| 1,760,336 | 5/1930 | Benjamin | 172—300 X |
| 2,881,848 | 4/1959 | Liston | 172—555 |
| 3,194,194 | 7/1965 | Phelps | 111—6 |

FOREIGN PATENTS 52,363 1/1921 Sweden.

ABRAHAM G. STONE, *Primary Examiner.*

J. R. OAKS, *Assistant Examiner.*